United States Patent Office 3,355,463
Patented Nov. 28, 1967

---

3,355,463
5-(2-OXO-2,5-DIHYDRO-4-FURYL)-BENZO(b)-FURANS AND INTERMEDIATES THEREFOR
Josef Schmitt, L'Hay-les-Roses, France, assignor to Etablissements Clin-Byla, Paris, France, a company of France
No Drawing. Filed Feb. 1, 1965, Ser. No. 429,642
Claims priority, application France, Feb. 7, 1964, 963,087
11 Claims. (Cl. 260—343.6)

This invention relates to derivatives of furan and to a method for their preparation. In particular the invention provides a new series of furan derivatives having the formula:

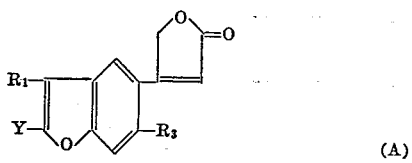

(A)

wherein $R_1$ represents a lower alkyl radical, $R_3$ represents a hydrogen atom or a lower alkoxy radical and Y represents the radical

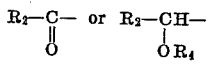

in which $R_2$ represents a lower alkyl radical, an unsubstituted phenyl radical or a phenyl radical having in one or more substitution positions, a hydroxyl radical, a lower aliphatic ester radical or a lower alkoxy radical (including a tertiary amino-substituted alkoxy radical) and $R_4$ represents a hydrogen atom, a lower alkyl radical or a mono- or dicarboxylic acyl radical.

The lower alkyl radicals may be linear or branched (particularly the lower alkyl radical represented by $R_1$) and the mono- or dicarboxylic acyl radical represented by $R_4$ is preferably a lower aliphatic acyl radical but other acyl radicals may also be present. The tertiary amine component of the tertiary amino-alkoxy radical may be aliphatic or cyclic.

From the viewpoint of the method of preparation, the compounds of the invention may be divided into two sub-series having the two general formulae below:

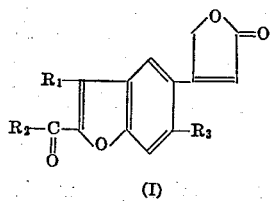
(I)

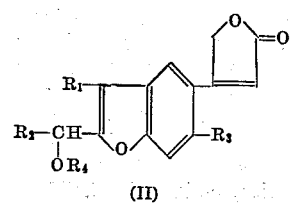
(II)

in which $R_1$, $R_2$, $R_3$ and $R_4$ have the same significance as above.

The compounds of the present invention are therapeutics and possess one or more of the following three types of therapeutic activity, coronary-dilatant, cardiotonic or hypotensive activity. The degree and type of activity for a particular compound depend upon the nature of the substituents.

The invention consequently includes a pharmaceutical composition for oral or parenteral administration which comprises, as the active ingredient, a compound of the formula (A) above in admixture with a pharmaceutically acceptable diluent or carrier.

One may prepare the compounds of the invention by starting from p-methoxy phenyl butenolide, i.e. 4-(4-methoxy phenyl) 2-oxo 2,5-dihydro furan, or from the corresponding lower alkoxy derivatives, i.e. starting with compounds corresponding to the formula

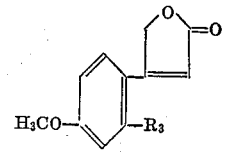

in which $R_3$ has the significance indicated above. p-Methoxy phenyl butenolide ($R_3$=H) is described by E. R. Marshall, J. A. Kuck and R. C. Elderfield (Journal of Organic Chemistry 1942, vol. 7, page 444).

Derivatives with a lower alkoxy substituent in position 2 of the benzene ring may be prepared by an analogous method.

The invention includes a method of preparation of compounds of Formula I comprising three successive stages summarised in the following equations, in which the symbols have the significance already indicated, and X stands for an halogen atom, especially a chlorine atom:

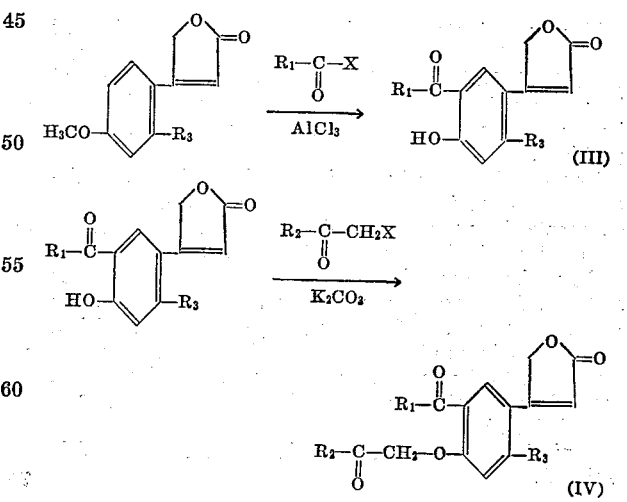

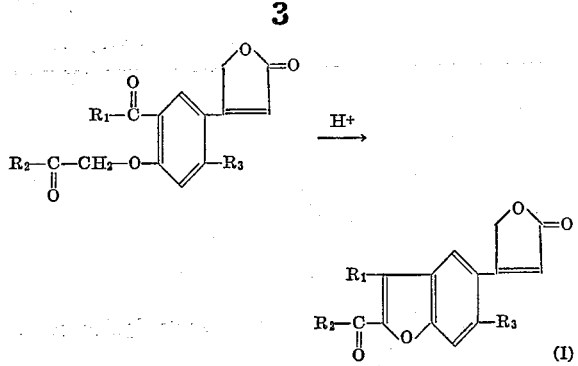

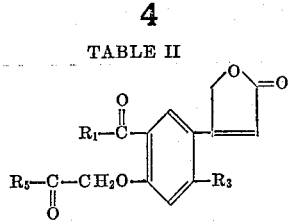

The intermediate compounds corresponding to Formulae III and IV have not previously been described and are included in the present invention.

The first reaction, which leads to a phenolic ketone (III) takes place by reaction of an acid halide, particularly the chloride, with the alkoxy phenyl butenolide in the presence of a Friedel-Crafts type of catalyst such as aluminum chloride, preferably in an appropriate diluent such as methylene chloride, dichlorethane or nitrobenzene, or alternatively in the presence of an excess of the acid halide used as the reactant. The reaction temperature may vary between room temperature and 70° C.; the time taken does not normally exceed ten hours.

Typical hydroxyketones prepared in the first stage are summarised in the following table, which includes a reference to the examples quoted later on.

TABLE I

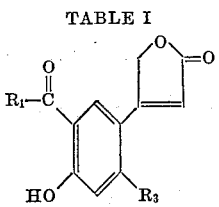

| Example No. | Identification Nos. (CB Nos.) | $R_1$ | $R_3$ |
|---|---|---|---|
| 1 | 1567 | $H_3C-$ | $H-$ |
| 2 | 1575 | $H_3C-H_2C-$ | $H-$ |
| 3 | 2666 | $H_3C-H_2C-H_2C-$ | $H-$ |
| 4 | 2667 | $H_3C-H_2C-H_2C-H_2C-$ | $H-$ |
| 5 | 4001 | $\begin{matrix}H_3C\\ \phantom{x}\diagdown\\ \phantom{xx}CH-H_2C-\\ \phantom{x}\diagup\\ H_3C\end{matrix}$ | $H-$ |
| 6 | 2774 | $H_3C-H_2C-$ | $H_3CO-$ |

The second stage consists of the condensation of the phenolic hydroxyl with an α-halogeno ketone $R_5$-CO-CH$_2$X, in which X stands for a halogen atom and $R_5$ a lower alkyl radical or a phenyl radical, which may have a lower alkoxy-substituent in one or more of its free positions.

The reaction may be carried out in a diluent, particularly dimethyl formamide, in the presence of an alkali carbonate, for example potassium carbonate; the dimethyl formamide solubilises the alkali salts of hydroxy ketones and permits the reaction to take place in a homogeneous medium. One may operate at temperatures between room temperature and 50° C. If the halogeno-ketone used is a chloro- or a bromo-ketone, one may increase its reactivity by adding to the medium a small quantity of an alkali metal iodide which transiently forms the corresponding organic iodo-ketone.

Typical compounds of Formula IV are enumerated in Table II.

TABLE II

| Ex. No. | $R_1$ | $R_5$ | $R_3$ |
|---|---|---|---|
| 7 | $H_3C-$ | $H_3C-$ | $H-$ |
| 8 | $H_3C-$ | $H_3C-H_2C-$ | $H-$ |
| 9 | $H_3C-H_2C-$ | $H_3C-$ | $H-$ |
| 10 | $H_3C-H_2C-H_2C-$ | $H_3C-$ | $H-$ |
| 11 | $H_3C-H_2C-H_2C-H_2C-$ | $H_3C-$ | $H-$ |
| 12 | $\begin{matrix}H_3C\\ \phantom{x}\diagdown\\ \phantom{xx}HC-CH_2\\ \phantom{x}\diagup\\ H_3C\end{matrix}$ | $H_3C-$ | $H-$ |
| 13 | $H_3C-H_2C-$ | $H_3C-$ | $H_3CO-$ |
| 14 | $H_3C-$ | $H_3CO-\langle\phantom{xx}\rangle-$ (with $H_3CO$) | $H-$ |
| 15 | $H_3C-H_2C-$ | $H_3CO-\langle\phantom{xx}\rangle-$ | $H-$ |
| 16 | $H_3C-H_2C-$ | $\langle\phantom{xx}\rangle-$ (with $OCH_3$) | $H-$ |
| 17 | $H_3C-H_2C-$ | $H_3CO-\langle\phantom{xx}\rangle-$ (with $H_3CO$) | $H-$ |
| 18 | $H_3C-H_2C-$ | $H_3CO-\langle\phantom{xx}\rangle-$ (with $H_3CO$, $H_3CO$) | $H-$ |

The third reaction which leads to certain of the compounds covered by Formula I takes place on more or less prolonged heating e.g. on a water bath, of compounds of Formula IV in the presence of a mineral acid reagent, for example hydrochloric acid. This technique is related to one of the general methods of synthesis of benzofurans (Chemistry of Carbon Compounds 1957, edited by E. H. Rodd, Volume IV A, page 170).

One may operate without a diluent, but preferably, with a diluent such as ethyl alcohol, acetic acid or dimethyl formamide. There is often an advantage in not isolating the intermediates (IV) and consequently directly acidifying the solution containing them to cause their cyclisation, with the formation of a benzofuran ring system.

Finally, in order to obtain compounds of Formula I in which $R_2$ is a mono- or poly-hydroxyphenyl radical, it is necessary to dealkylate (generally demethylate) a compound of the Formula IV in which $R_5$ is an alkoxy-substituted phenyl radical by means of a dealkylation agent, preferably aluminium chloride, in an inert diluent such as refluxing benzene. The period of heating varies but does not normally exceed ten hours. The resultant phenolic hydroxyl radical or radicals may be subsequently acylated by heating with an excess of an acid anhydride, or etherified to introduce a different alkoxy radical, for example a tertiary amino-alkoxy radical. Etherification to form a tertiary amino-alkoxy groups is preferably carried out in a diluent such as dimethyl formamide, using a tertiary amino-alkyl halide as the alkylation agent, and in the presence of an alkaline reagent such as potassium carbonate.

Typical compounds of the Formula I are summarised in Table III.

TABLE III

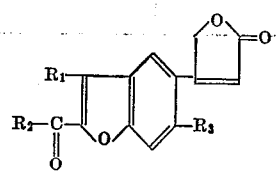

| Ex. No. | Identification Nos. (CB Nos.) | $R_1$ | $R_2$ | $R_3$ |
|---|---|---|---|---|
| 19 | 3556 | $H_3C-$ | $H_3C-$ | $H-$ |
| 20 | 3638 | $H_3C-$ | $H_3C-H_2C-$ | $H-$ |
| 21 | 3641 | $H_3C-H_2C-$ | $H_3C-$ | $H-$ |
| 22 | 3671 | $H_3C-H_2C-H_2C-$ | $H_3C-$ | $H-$ |
| 23 | 3772 | $H_3C-H_2C-H_2C-H_2C-$ | $H_3C-$ | $H-$ |
| 24 | 4000 | $(H_3C)_2HC-H_2C-$ | $H_3C-$ | $H-$ |
| 25 | 3676 | $H_3C-H_2C-$ | $H_3C-$ | $H_3CO-$ |
| 26 | 4245 | $H_3C-$ | $H_3CO-C_6H_3(OCH_3)-$ | $H-$ |
| 27 | 4106 | $H_3C-$ | $HO-C_6H_3(OH)-$ | $H-$ |
| 28 | 4032 | $H_3C-H_2C-$ | $H_3CO-C_6H_4-$ | $H-$ |
| 29 | 4030 | $H_3C-H_2C-$ | $HO-C_6H_4-$ | $H-$ |
| 30 | 4053 | $H_3C-H_2C-$ | $(H_5C_2)_2N-H_2C-H_2C-O-C_6H_4-$ | $H-$ |
| 31 | 4246 | $H_3C-H_2C-$ | $(H_3C)_2N-H_2C-HC(CH_3)-O-C_6H_4-$ | $H-$ |
| 32 | 4079 | $H_3C-H_2C-$ | $C_6H_4-OCH_3$ | $H-$ |
| 33 | 4085 | $H_3C-H_2C-$ | $C_6H_4-OH$ | $H-$ |
| 34 | 3970 | $H_3C-H_2C-$ | $H_3CO-C_6H_3(OCH_3)-$ | $H-$ |
| 35 | 4140 | $H_3C-H_2C-$ | $H_5C_2O-C_6H_3(OC_2H_5)-$ | $H-$ |
| 36 | 4061 | $H_3C-H_2C-$ | $HO-C_6H_3(OH)-$ | $H-$ |
| 37 | 4070 | $H_3C-H_2C-$ | $CH_3-CO-O-C_6H_3(O-CO-CH_3)-$ | $H-$ |
| 38 | 4055 | $H_3C-H_2C-$ | $H_3CO-C_6H_3(OCH_3)-$ | $H-$ |

TABLE III—Continued

| Ex. No. | Identification Nos. (CB Nos.) | R₁ | R₂ | R₃ |
|---|---|---|---|---|
| 39 | 4075 | H₃C—H₂C— | 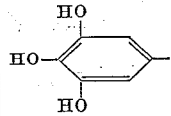 | H— |
| 40 | 4126 | H₃C—H₂C—H₂C— | 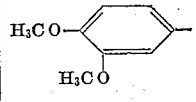 | H— |

The invention also includes a method of preparing compounds having the Formula II which comprises subjecting the ketones of Formula I to controlled reduction by means of an alkali metal borohydride, particularly sodium borohydride, which preserves the butenolide group (N. G. Gaylord, Reduction with complex metal hydrides—Interscience Publishers, 1956, pages 533). This may be carried out in methanol or, for products which dissolve with difficulty in methanol, in a mixture of diluents comprising methanol and a diluent such as ethyl acetate, methylene chloride, dimethyl formamide, dioxane or water.

The reaction temperature used is preferably close to room temperature; the time required for the reaction does not normally exceed a few hours. The reaction results in secondary alcohols ($R_4$=H) and these may be esterified with a monobasic or dibasic acid. The reaction may be carried out by warming the secondary alcohols with the appropriate acid anhydride, used by itself or in the presence of pyridine. The secondary alcohols may also be etherified to form a lower aliphatic alkoxy radical, and this is done via a halogenated alkyl derivative which is caused to react with the desired alcohol.

Table IV summarises typical compounds of Formula II.

TABLE IV

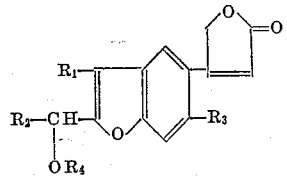

| Example No. | Identification Nos. (CB Nos.) | R₁ | R₂ | R₃ | R₄ |
|---|---|---|---|---|---|
| 41 | 3574 | H₃C— | H₃C— | H— | H— |
| 42 | 3865 | H₃C— | H₃C— | H— | H₃C—OC— |
| 43 | 4091 | H₃C— | H₃C— | H— | HOOC—H₂C—H₂C—OC— |
| 44 | 3639 | H₃C— | H₃C—H₂C— | H— | H— |
| 45 | 3640 | H₃C—H₂C— | H₃C— | H— | H— |
| 46 | 3877 | H₃C—H₂C— | H₃C— | H— | H₃C—H₂C—H₂C—OC— |
| 47 | 3984 | H₃C—H₂C— | H₃C— | H— | HOOC—H₂C—H₂C—OC— |
| 48 | 3887 | H₃C—H₂C— | H₃C— | H— | H₃C— |
| 49 | 3665 | H₃C—H₂C—H₂C— | H₃C— | H— | H— |
| 50 | 3670 | H₃C—H₂C—H₂C—H₂C— | H₃C— | H— | H— |
| 51 | 3688 | H₃C—H₂C— | H₃C— | H₃CO— | H— |
| 52 | 4010 | (H₃C)₂HC—H₂C— | H₃C— | H— | H— |
| 53 | 4103 | H₃C— | 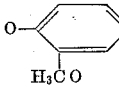 | H— | H— |
| 54 | 4033 | H₃C—H₂C | 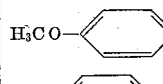 | H— | H— |
| 55 | 4054 | H₃C—H₂C— | 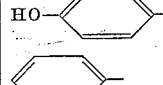 | H— | H— |
| 56 | 4083 | H₃C—H₂C— | 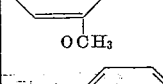 | H— | H— |
| 57 | 4025 | H₃C—H₂C— | 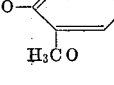 | H— | H— |

TABLE IV—Continued

| Example No. | Identification Nos. (CB Nos.) | $R_1$ | $R_2$ | $R_3$ | $R_4$ |
| --- | --- | --- | --- | --- | --- |
| 58 | 4141 | $H_3C-H_2C-$ | $H_5C_2O-\langle\rangle-$, $H_5C_2O-$ | $H-$ | $H-$ |
| 59 | 4058 | $H_3C-H_2C-$ | $H_3CO-\langle\rangle-$, $H_3CO-$ | $H-$ | $H-$ |
| 60 | 4217 | $H_3C-H_2C-H_2C-$ | $H_3CO-\langle\rangle-$, $H_3CO-$ | $H-$ | $H-$ |

The following examples illustrate the invention. The abbreviations $MP_c$ and $MP_k$ refer to the melting point (degrees C.) measured respectively in a capillary tube and on a Kofler bench. The temperatures are all in degrees centigrade.

EXAMPLE 1

*4-(3-acetyl 4-hydroxy phenyl) 2-oxo 2,5-dihydro furan (1567 CB)*

(a) A solution of 57 g. of 4-(4-methoxy phenyl) 2-oxo 2,5-dihydro furan (0.3 mole) in 300 ml. of methylene chloride is added slowly to 200 g. of anhydrous powdered aluminium chloride, whilst stirring and cooling in a bath of iced water. When this is completed, one removes the bath and leaves the reagents in contact for 10 minutes, and then introduces 72 g. of acetyl chloride at a speed sufficient to maintain refluxing of the solvent. One subsequently heats under reflux for 3 hours 30 minutes, decomposes by pouring on to crushed ice, filters off the crystalline product and washes it with water. 56 g.; $MP_c=200°$ C. yield: 80%. The product is recrystallised from acetic acid and then melts at 201–202° C.

(b) Operating as under (a) but replacing the methylene chloride by dichlorethane, one obtains compound 1567 CB in the same yield.

(c) 36 g. of aluminium chloride and 21 g. of acetyl chloride are added to 20 ml. of nitrobenzene and thereafter 10 g. (0.0527 mole) of 4-(4-methoxy phenyl) 2-oxo 2,5-dihydro furan dissolved in 50 ml. of nitrobenzene are added drop by drop, with stirring. One warms for 2 hours at 60–70° C., cools, pours on to crushed ice, dilutes with ether and filters. 8 g. of product are obtained (yield: 65%). $MP_c=200°$ C.

EXAMPLE 2

*4-(3-propionyl 4-hydroxy phenyl) 2-oxo 2,5-dihydro furan (1575 CB)*

8 g. of anhydrous powdered aluminium chloride is added in stages to a solution of 3.8 g. (0.02 mole) of 4-(4-methoxy phenyl) 2-oxo 2,5-dihydro furan in 20 ml. of propionyl chloride. The mixture is heated for one hour at 70° C., subsequently cooled and poured on to crushed ice, filtered and the residue crystallised from acetic acid. $MP_c=213°$ C.; yield: 65%.

EXAMPLE 3

*4-(3-butyryl 4-hydroxy phenyl) 2-oxo 2,5-dihydro furan (2666 CB)*

One proceeds as in Example 2 but replacing the propionyl chloride by butyryl chloride in equivalent amount. $MP_c=158-159°$ C. (from acetic acid); yield: 44%.

EXAMPLE 4

*4-(3-valeryl 4-hydroxy phenyl) 2-oxo 2,5-dihydro furan (2667 CB)*

One proceeds as in Example 2 but replacing the propionyl chloride by valeryl chloride in equivalent amount. Yield 40%. The product crystallises from ethanol and melts at 139–140° C. ($MP_c$).

EXAMPLE 5

*4-(3-isovaleryl 4-hydroxy phenyl) 2-oxo 2,5-dihydro furan (4001 CB)*

One proceeds as in Example 2 but replacing the propionyl chloride by isovaleryl chloride in equivalent amount. Yield: 40%. $MP_c=128-129°$ C. (from ethanol).

EXAMPLE 6

*4-(4-hydroxy 2-methoxy 5-propionyl phenyl) 2-oxo 2,5-dihydro furan (2774 CB)*

30 g. of propionyl chloride and 35 g. of aluminium chloride are added to 40 ml. of nitrobenzene and followed by 20 g. of 4-(2,4-dimethoxy phenyl) 2-oxo 2,5-dihydro furan, dissolved in 80 ml. of nitrobenzene. The mixture is heated for 30 minutes at 60° C., poured on to crushed ice and hydrochloric acid, filtered and recrystallised from acetic acid. Yield: 75%. $MP_c=192°$ C.

EXAMPLE 7

*4-[3-acetyl 4-(2-oxo propyloxy) phenyl] 2-oxo 2,5-dihydro furan*

5.45 g. (0.025 mole) of compound 1567 CB (prepared according to Example 1) dissolved in 50 ml. of dimethyl formamide is stirred at room temperature for 15 minutes with 5 g. of potassium carbonate and 1 g. of sodium iodide, and 5 g. of chloracetone are then added drop by drop. The temperature spontaneously rises a few degrees. The disappearance of the phenolic compound is checked by testing with an alcoholic solution of ferric chloride; this test should be negative at the end of the reaction (approximately 2 hours). One then dilutes with 10 volumes of water, filters the product which crystallises out under these conditions and recrystallises it from acetic acid. It has the form of yellow needles (4 g. yield: 63%). $MP_c=155-157°$ C.

EXAMPLE 8

*4-[3-acetyl 4-(2-oxo butyloxy) phenyl] 2-oxo 2,5-dihydro furan*

One proceeds as in Example 7 but replacing the chloracetone by 1-bromo 2-oxo butane in equimolecular quantity. $MP_c=131-132°$ C. (from methanol). Yield: 66%.

EXAMPLE 9

*4-[3-propionyl 4-(2-oxo propyloxy) phenyl] 2-oxo 2,5-dihydro furan*

One proceeds as in Example 7 but replacing compound 1567 CB by 1575 CB in equimolecular amount. The product is obtained as crystals having a $MP_c$ of 131–132° C. (recrystallisation from ethanol). Yield: 75%.

EXAMPLE 10

*4-[3-butyryl 4-(2-oxo propyloxy) phenyl] 2-oxo 2,5-dihydro furan*

One proceeds as in Example 7 but replacing 1567 CB by 2666 CB in equimolecular amount. $MP_c$=134° C. (from ethanol). Yield: 70%.

EXAMPLE 11

*4-[3-valeryl 4-(2-oxo propyloxy) phenyl] 2-oxo 2,5-dihydro furan*

One proceeds as in Example 7 but replacing compound 1567 CB by 2667 CB in equimolecular amount. $MP_c$=138° C. (from methanol). Yield: 59%.

EXAMPLE 12

*4-[3-isovaleryl 4-(2-oxo propyloxy) phenyl] 2-oxo 2,5-dihydro furan*

One proceeds as in Example 7 but replacing compound 1567 CB by 4001 CB in equimolecular amount. $MP_c$=108° C. (from methanol). Yield: 58%.

EXAMPLE 13

*4-[2-methoxy 5-propionyl 4-(2-oxo propyloxy) phenyl] 2-oxo 2,5-dihydro furan*

One proceeds as in Example 7 but replacing compound 1567 CB by 2774 CB in equimolecular amount. $MP_c$=190° C. (from acetic acid). Yield: 75%.

EXAMPLE 14

*4-[3acetyl 2-(3,4-dimethoxy phenyl) 4-(2-oxo ethyloxy) phenyl] 2-oxo 2,5-dihydro furan*

60 g. of powdered potassium carbonate are added, with stirring, to a solution of 58.2 g. (0.3 mole) of compound 1567 CB in 450 ml. of dimethyl formamide. After 15 minutes 78.5 g. of 1-bromacetyl 3,4-dimethoxy benzene is added. The temperature spontaneously rises a few degrees. When the exothermic reaction is over, one heats to 60° C., pours into water, filters the crystalline product and recrystallises the same from acetic acid. $MP_k$=192–193° C. Yield: 63%.

EXAMPLE 15

*4-[3-propionyl 2-(4-methoxy phenyl) 4-(2-oxo ethyloxy) --phenyl] 2-oxo 2,5-dihydro furan*

One proceeds as in Example 14 but replacing compound 1567 CB by 1575 CB in equimolecular amount, and replacing the 1-bromacetyl 3,4-dimethoxy benzene by 1-bromacetyl 4-methoxy benzene in equimolecular amount. $MP_c$=174° C. (from acetic acid). Yield: 63%.

EXAMPLE 16

*4-[3-propionyl 2-(2-methoxy phenyl) 4-(2-oxo ethyloxy) phenyl] 2-oxo 2,5-dihydro furan*

One proceeds as in Example 14 but replacing compound 1567 CB by 1575 CB in equimolecular amount, and replacing 1-bromacetyl 3,4-dimethoxy benzene by 1-bromacetyl 2-methoxy benzene in equimolecular amount. $MP_c$=187–188° C. (from acetic acid). Yield: 62%.

EXAMPLE 17

*4-[3-propionyl 2-(3,4-dimethoxy phenyl) 4-(2-oxo ethyloxy) phenyl] 2-oxo 2,5-dihydro furan*

One proceeds as in Example 14 but replacing compound 1567 CB by 1575 CB in equimolecular amount. $MP_c$=197° C. (from acetic acid). Yield: 92%.

EXAMPLE 18

*4-[3-propionyl 2-(3,4,5-trimethoxy phenyl) 4-(2-oxo ethyloxy phenyl] 2-oxo 2,5-dihydro furan*

One proceeds as in Example 14 but replacing compound 1567 CB by 1575 CB in equimolecular amount and replacing 1-bromacetyl 3,4-dimethoxy benzene by 1-bromacetyl 3,4,5-trimethoxy benzene in equimolecular amount. $MP_k$=254° C. (from acetic acid); yield: 33%.

EXAMPLE 19

*2-acetyl 3-methyl 5-(2-oxo 2,5-dihydro 4-furyl) benzo [b] furan (3556 CB)*

(a) A suspension of 2 g. of the compound prepared according to Example 7, in 20 ml. of concentrated hydrochloric acid, is heated to about 50° C., just until it dissolves. Thereafter it is heated for 2 minutes to 70° C., just until precipitation commences. The mixture is allowed to cool, diluted with water, filtered, the residue washed, dried, and sublimed at 200° C. and 0.1 mm. pressure. 1.4 g. of product (yield: 70%) is obtained. $MP_c$=218–221° C. A second sublimation produces a chemically pure product. $MP_c$= 221–222° C.

(b) Compound 1567 CB and chloracetone are caused to react as in Example 7, the mineral salts subsequently filtered, 12 ml. of concentrated hydrochloric acid are added to the solution in dimethyl formamide without dilution with water, and the mixture heated for 40 minutes on a water bath. The product crystallises in the warm mixture, the mixture is cooled to room temperature, filtered, the residue washed with water and crystallised from acetic acid. $MP_c$=222° C. Yield: 60% based on compound 1567 CB.

EXAMPLE 20

*2-propionyl 3-methyl 5-(2-oxo 2,5-dihydro 4-furyl) benzo [b] furan (3638 CB)*

One proceeds as indicated in Example 19a, replacing the compound prepared according to Example 7 by that prepared according to Example 8. $MP_c$=221° C. (from acetic acid); yield: 60%.

EXAMPLE 21

*2-acetyl 3-ethyl 5-(2-oxo, 2,5-dihydro 4-furyl) benzo [b] furan (3641 CB)*

44 ml. of concentrated hydrochloric acid are added little by little to a boiling suspension of 44 g. of the compound prepared according to Example 9, in 310 ml. of absolute ethanol. The product used progressively dissolves (in 10 minutes) and subsequently compound 3641 CB crystallises in a few minutes. The mixture is cooled and filtered and one obtains 36 g. (yield: 87%) of the product. $MP_c$=182° C.

EXAMPLE 22

*2-acetyl 3-propyl 5-(2-oxo 2,5-dihydro 4-furyl) benzo [b] furan (3671 CB)*

One proceeds as in Example 19a but replacing the compound prepared according to Example 7 by an equimolecular amount of the compound prepared according to Example 10. $MP_c$=173° C. (from methanol; yield: 50%.

EXAMPLE 23

*2-acetyl 3-butyl 5-(2-oxo 2,5-dihydro 4-furyl) benzo [b] furan (3672 CB)*

A solution of 0.02 mole of the compound prepared according to Example 11, in 12 ml. of acetic acid, is heated to boiling and 12 ml. of concentrated hydrochloric acid then added. The mixture is maintained at the boil for about 2 minutes, cooled, diluted with water, the crystallised product filtered off and recrystallised from ethanol. $MP_c = 155°$ C.; yield: 60%.

EXAMPLE 24

*2-acetyl 3-isobutyl 5-(2-oxo 2,5-dihydro 4-furyl) benzo [b] furan*

One proceeds as in Example 19a but replacing the compound prepared according to Example 7 by the compound prepared according to Example 12. $MP_c = 207°$ C. (from acetic acid); yield: 80%.

EXAMPLE 25

*2-acetyl 3-ethyl 5-(2-oxo 2,5-dihydro 4-furyl) 6-methoxy benzo [b] furan (3676 CB)*

One proceeds as in Example 23 but replacing the compound prepared according to Example 11 by an equimolecular amount of the compound prepared in Example 13. MP=254° C. (on a heated plate microscope); yield: 80%.

EXAMPLE 26

*3-methyl 2-veratroyl 5-(2-oxo 2,5-dihydro 4-furyl) benzo [b] furan (4245 CB)*

52.5 g. of the product made according to Example 14, in 360 ml. of acetic acid, together with 52.5 ml. of concentrated hydrochloric acid are warmed on a water bath. The starting product dissolves and subsequently compound 4245 CB crystallises from the warm mixture. One cools, filters and obtains 46 g. of product. $MP_k = 210°$ C.; yield: 92%. After sublimation at 180° C./0.1 mm., the product melts at 211–212° C. (Kofler).

EXAMPLE 27

*2-(3,4-dihydroxy benzoyl) 3-methyl 5-(2-oxo 2,5-dihydro 4-furyl) benzo [b] furan (4106 CB)*

10 g. of compound 4245 CB prepared according to Example 26, in 100 ml. of anhydrous benzene, together with 27 g. of anhydrous aluminium chloride, are heated under reflux for 8 hours. The mixture is cooled, poured on to ice, filtered and recrystallised first from acetic acid and then from ethanol containing 40% water. MP=280° C. (with decomposition, heated plate microscope); yield: 20%.

EXAMPLE 28

*2-anisoyl 3-ethyl 5-(2-oxo 2,5-dihydro 4-furyl) benzo [b] furan (4032 CB)*

One proceeds as in Example 26 but replacing, in that method, the product prepared according to Example 14 by the product prepared according to Example 15.

$MP_c = 202$–203° C.; yield: 86%

EXAMPLE 29

*2-(4-hydroxy benzoyl) 3-ethyl 5-(2-oxo 2,5-dihydro 4-furyl) benzo [b] furan (4030 CB)*

One proceeds as in Example 27 but replacing, in that method, compound 4245 CB by 4032 CB. The instantaneous melting point is 290° C. (with decomposition on the heated plate microscope); yield: 69%.

EXAMPLE 30

*2-[4-(2-diethylamino ethoxy) benzoyl] 3-ethyl 5-(2-oxo 2,5-dihydro 4-furyl) benzo [b] furan (4053 CB)*

1 g. of potassium carbonate is added to a solution of 1 g. of compound 4030 CB in 20 ml. of dimethyl formamide, and stirred for 15 minutes. One then adds 1.2 g. of 1-chloro 2-diethylamino ethane. The mixture is stirred at room temperature for 4 hours then poured into water and extracted with ethyl acetate. One washes with water, evaporates the solvent and crystallises from methanol; 0.6 g. are obtained; yield: 46%. $MP_c = 121°$ C. The chlorhydrate, crystallised from ethanol, melts at 210° C. ($MP_c$).

EXAMPLE 31

*2-[4-(2-dimethylamino 1-methyl ethoxy) benzoyl] 3-ethyl 5-(2-oxo 2,5-dihydro 4-furyl) benzo [b] furan (4246 CB)*

One proceeds as in Example 30 but with the following modifications: 1-chloro 2-diethylamino ethane is replaced by 1-dimethylamino 2-chloro propane and one heats at 50° C. for 2 hours after addition of the amine reagent. After extraction with ethyl acetate and evaporation of the solvent, the product obtained is purified via its chlorhydrate. The base, liberated by addition of a sodium carbonate solution to the chlorhydrate, finally melts at 129° C. ($MP_c$, from methanol); low yield.

EXAMPLE 32

*2-(2-methoxy benzoyl) 3-ethyl 5-(2-oxo 2,5-dihydro 4-furyl) benzo [b] furan (4079 CB)*

One proceeds as in Example 26 but replacing, in that method, the product prepared according to Example 14 by the product prepared according to Example 16. $MP_k = 170°$ C. (from acetic acid); yield is practically quantitative.

EXAMPLE 33

*2-salicyloyl 3-ethyl 5-(2-oxo 2,5-dihydro 4-furyl) benzo [b] furan (4085 CB)*

One proceeds as in Example 27 but replacing, in that method, compound 4245 CB by 4079 CB. Yield: 69% $MP_k = 258°$ C.

EXAMPLE 34

*2-veratroyl 3-ethyl 5-(2-oxo 2,5-dihydro 4-furyl) benzo [b] furan (3970 CB)*

14 g. of potassium carbonate are added to a solution of 14 g. of compound 1575 CB in 100 ml. of dimethyl formamide; after 15 minutes of stirring 16.7 g. of 1-bromoacetyl 3,4-dimethoxy benzene are added. The temperature spontaneously rises a few degrees; the mixture is thereafter heated for 30 minutes at 50° C. and at 70° C. for a brief period, and the insoluble mineral salts are filtered hot; 55 ml. of concentrated hydrochloric acid are added to the solution which has been freed of its salts, the mixture heated for 2 hours on the water bath, cooled, and the crystalline product filtered. A second fraction of the product is obtained by diluting its mother liquor with water. The two fractions are combined and together crystallised from acetic acid. $MP_k = 195°$ C.; yield: 80% (based on 1575 CB).

EXAMPLE 35

*2-(3,4-diethoxy benzoyl) 3-ethyl 5-(2-oxo 2,5-dihydro 4-furyl) benzo [b] furan (4140 CB)*

One proceeds as in Example 34 but replacing 1-bromacetyl 3,4-dimethoxy benzene by 1-bromaceytl 3,4-diethoxy benzene in equimolecular amount. Yield: 54%. $MP_c = 208°$ C.

EXAMPLE 36

*2-(3,4-dihydroxy benzoyl) 3-ethyl 5-(2-oxo 2,5-dihydro 4-furyl) benzo [b] furan (4061 CB)*

One proceeds as in Example 27 but replacing compound 4245 CB by an equimolecular amount of compound 3970 CB. Yield 53%: MP=265–267° C. (heated plate microscope).

EXAMPLE 37

*2-(3,4-diacetoxy benzoyl) 3-ethyl 5-(2-oxo 2,5-dihydro 4-furyl) benzo [b] furan (4070 CB)*

2 g. of compound 4061 CB are refluxed in 40 ml. of acetic anhydride for 3 hours. The excess anhydride is distilled off in vacuo and the residue crystallised from ethyl acetate. 1.6 g. of compound 4070 CB are obtained. Yield: 64%. MP$_c$=183–184° C.

EXAMPLE 38

2-(3,4,5-trimethoxy benzoyl) 3-ethyl 5-(2-oxo 2,5-dihydro 4-furyl) benzo [b] furan (4055 CB)

One proceeds as indicated in Example 26 but replacing the product made according to Example 14 by an equimolecular amount of the product made according to Example 18. Yield: 78%. MP$_k$=223° C.

EXAMPLE 39

3-ethyl 2-galloyl 5-(2-oxo 2,5-dihydro 4-furyl) benzo [b] furan (4075 CB)

One proceeds as in Example 27 but replacing compound 4245 CB by an equimolecular amount of compound 4055 CB. Yield: 68%. MP$_k$=260° C. (from acetic acid).

EXAMPLE 40

2-veratroyl 3-propyl 5-(2-oxo 2,5-dihydro 4-furyl) benzo [b] furan (4126 CB)

One proceeds as in Example 34 but replacing compound 1575 CB by an equimolecular amount of compound 2666 CB. Yield: 40%. MP$_k$=218° C.

EXAMPLE 41

2-(1-hydroxy ethyl) 3-methyl 5-(2-oxo 2,5-dihydro 4-furyl) benzo [b] furan (3574 CB)

13.2 g. of compound 3556 CB (of which the preparation is described in Example 19) are treated successively with 66 ml. of methylene chloride, 27 ml. of methanol and, with stirring, 1.6 g. of sodium borohydride added in stages. The reaction takes 1 hour. The mixture is poured into water acidified with a sufficient amount of acetic acid, the solvents are stripped under vacuum, the crystalline product removed, washed with water, and recrystallised from ethyl acetate. Yield: 90%. MP$_k$=158° C.

EXAMPLE 42

2-(1-acetoxy ethyl) 3-methyl 5-(2-oxo 2,5-dihydro 4-furyl) benzo [b] furan (3865 CB)

4.1 g. of compounds 3574 CB in 40 ml. of acetic anhydride are heated under reflux for 5 hours; the excess anhydride is stripped in vacuo and the residue crystallised from ethyl acetate. Yield: 47%. MP$_c$=161–162° C.

EXAMPLE 43

2-(1-succinyloxy ethyl) 3-methyl 5-(2-oxo 2,5-dihydro 4-furyl) benzo [b] furan (4091 CB)

8.65 g. of compound 3574 CB in 43 ml. of pyridine are warmed for 30 minutes, on a water bath, with succinic anhydride. At the end of this, the pyridine is stripped off in vacuo. The mixture is treated with dilute sulphuric acid and with ether, the crystalline product filtered off, washed with water and with ether, and recrystallised from ethyl acetate (9.35 g.). MP$_c$=144° C. (measured after drying at 90° C. and 0.1 mm.). Yield: 77%. The product yields an equimolecular compound with morpholine. MP$_c$=136° C. (from ethyl acetate).

EXAMPLE 44

2-(1-hydroxy propyl) 3-methyl 5-(2-oxo 2,5-dihydro 4-furyl) benzo [b] furan (3639 CB)

0.5 g. of sodium borohydride are added little by little to 1.9 g. of compound 3638 CB in 40 ml. of methanol, taking care that the temperature does not rise above 30° C. After 1 hour the mixture is poured into dilute acetic acid, the methanol stripped off in vacuo, the residue diluted with water, the crystalline product filtered off and recrystallised from ethyl acetate. 1.1 g. (57%) are obtained; MP$_c$=158° C.

EXAMPLE 45

2-(1-hydroxy ethyl) 3-ethyl 5-(2-oxo 2,5-dihydro 4-furyl) benzo [b] furan (3640 CB)

One proceeds as in Example 41 but replacing compound 3556 CB by an equimolecular amount of 3641 CB. Yield: 85%. MP$_c$=184° C. (from ethanol).

EXAMPLE 46

1-(1-butyryloxy ethyl) 3-ethyl 5-(2-oxo 2,5-dihydro 4-furyl) benzo [b] furan (3877 CB)

2 g. of compound 3640 CB in 20 ml. of butyric anhydride are heated at 150° C. for 6 hours. The excess anhydride is stripped in vacuo and the residue crystallised from a mixture of cyclohexane and ether. 2 g. of product are obtained. MP$_c$=89° C.; yield: 80%.

EXAMPLE 47

2-(1-succinyloxy ethyl) 3-ethyl 5-(2-oxo 2,5-dihydro 4-furyl) benzo[b]furan (3984 CB)

One proceeds as in Example 43 but replacing compound 3574 CB by an equimolecular amount of compound 3640 CB. Yield 63%. MP$_c$=138–140° C. (after drying the product at 90° C. and 0.1 mm.). With morpholine this product yields an equimolecular compound of MP$_c$=116–117° C. (from ethyl acetate).

EXAMPLE 48

2-(1-methoxy ethyl) 3-ethyl 5-(2-oxo 2,5-dihydro 4-furyl) benzo[b]furan (3887 CB)

5 g. of compound 3640 CB are heated under reflux with 7.5 ml. of concentrated hydrochloric acid and 75 ml. of methylene chloride, for 30 minutes. The solvent is stripped off in vacuo. The residue is treated with water, filtered, and the chlorinated derivative crystallised from isopropyl ether. 5 g. of product are obtained. MP$_c$=138° C. (with decomposition).

This derivative is treated with 50 ml. of methanol, under reflux, for 1 hour, the excess methanol stripped in vacuo, and the residue crystallised twice from isopropyl ether. 2 g. of product (38%) are obtained. MP$_c$=123° C.

EXAMPLE 49

2-(1-hydroxy ethyl) 3-propyl 5-(2-oxo 2,5-dihydro 4-furyl) benzo[b]furan (3665 CB)

One proceeds as indicated in Example 44 but replacing compound 3638 CB by an equimolecular amount of compound 3671 CB. MP$_c$=168° C. (from methanol). Yield: 66%.

EXAMPLE 50

2-(1-hydroxy ethyl) 3-butyl 5-(2-oxo 2,5-dihydro 4-furyl) benzo[b]furan (3670 CB)

One proceeds as in Example 44 but replacing compound 3638 CB by compound 3672 CB. MP$_c$=161° C. (from methanol). Yield: 77%.

EXAMPLE 51

2-(1-hydroxy ethyl) 3-ethyl 5-(2-oxo 2,5-dihydro 4-furyl) 6-methoxy benzo[b]furan (3688 CB)

3 g. of compound 3676 CB in 100 ml. of dioxane are treated with 130 ml. of methanol and, adding a little at a time, 2 g. of sodium borohydride. The mixture is poured into dilute acetic acid, the solvents stripped in vacuo, the crystalline product filtered off, washed with water and crystallised twice from methanol. 1.2 g. of product are obtained; yield=40%. MP$_c$=163° C.

EXAMPLE 52

2-(1-hydroxy ethyl) 3-isobutyl 5-(2-oxo 2,5-dihydro 4-furyl) benzo[b] (4010 CB)

1.5 g. of sodium borohydride are added little by little to a suspension of 10 g. of 4000 CB in 60 ml. of methanol and 100 ml. of ethyl acetate. After having been in contact for 30 minutes, the mixture is poured into dilute acetic acid, the solvents stripped in vacuo, the residue diluted with water, filtered, the product washed with water and crystallised from ethanol. 9.5 g. of product are obtained; yield 95%. $MP_c=179°$ C.

EXAMPLE 53

[2-(3,4-dimethoxy phenyl)-hydroxy-methyl] 3-methyl 5-(2-oxo 2,5-dihydro 4-furyl) benzo[b]furan (4103 CB)

One proceeds as in Example 41 but with the following changes: compound 3556 CB is replaced by an equimolecular amount of compound 4246 CB and is left in contact with the sodium borohydride for 4 hours. $MP_c=166-167°$ C. (from ethyl acetate); yield: 73%.

EXAMPLE 54

2-(anisoyl-hydroxy-methyl) 3-ethyl 5-(2-oxo 2,5-dihydro furyl-4) benzo[b]furan (4033 CB)

One proceeds as indicated in Example 52 but with the following changes: compound 4000 CB is replaced by an equimolecular amount of compound 4032 CB; the reduction is carried out in 20 volumes of ethyl acetate and 4 volumes of methanol and contact with the sodium borohydride is allowed for 1 hour 30 minutes: $MP_c=150-151°$ C. (from ethyl acetate). Yield. 80%.

EXAMPLE 55

2-[(4-hydroxy phenyl)-hydroxy-methyl] 3-ethyl 5-(2-oxo 2,5-dihydro 4-furyl) benzo[b]furan (4054 CB)

2 g. of sodium borohydride are progressively added to 2.1 g. of compound 4030 CB in suspension in 100 ml. of methanol and 50 ml. of water. The starting solid dissolves gradually. The mixture is allowed to stand for 1 hour and then poured into very dilute sulphuric acid. It is filtered to remove an insoluble product and the filtrate concentrated down to a small volume: on cooling, crystals deposit and these are recrystallised from ethanol (0.8 g.). $MP_c=190°$ C. (with decomposition). Yield: 38%.

EXAMPLE 56

2-[(2-ethoxy phenyl)-hydroxy-methyl] 5-(2-oxo 2,5-dihydro 4-furyl) benzo[b]furan (4083 CB)

One proceeds as in Example 54 but replacing compound 4032 CB by an equimolecular amount of compound 4079 CB. $MP_c=208-209°$ C. (from ethyl acetate); Yield: 80%.

EXAMPLE 57

2-[(3,4-dimethoxy phenyl)-hydroxy-methyl] 3-ethyl 5-(2-oxo 2,5-dihydro 4-furyl) benzo[b]furan (4025 CB)

4 g. of sodium borohydride are added gradually to a suspension of 8 g. of compound 3970 CB in 400 ml. of ethyl acetate and 120 ml. of methanol. The mixture is allowed to stand for 2 hours, poured into dilute acetic acid, the solvents stripped on vacuo, the residue diluted with water, and the product crystallised from methyl ethyl ketone. 6 g. of product are obtained: $MP_c=189-190°$ C.; yield: 75%.

The reaction may also be carried out either in a mixture of 8 vol. of methylene chloride and 2 vol. of methanol, or in a mixture of 5 vol. of dimethyl formamide and 2 vol. of methanol; the yields are a little lower.

EXAMPLE 58

2-[(3,4-diethoxy phenyl)-hydroxy-methyl] 3-ethyl 5-(2-oxo 2,5-dihydro 4-furyl) benzo[b]furan (4141 CB)

One proceeds as in Example 41 but replacing compound 3556 CB by an equimolecular amount of compound 4140 CB. $MP_c=188°$ C. (from methyl ethyl ketone); yield 94%.

EXAMPLE 59

2-[(3,4,5-trimethoxy phenyl)-hydroxy-methyl] 3-ethyl 5-(2-oxo 2,5-dihydro 4-furyl) benzo[b]furan (4058 CB)

One proceeds as in Example 57 but replacing compound 3970 CB by an equimolecular amount of compound 4055 CB. $MP_c=178°$ C. (from ethanol). Yield: 84%.

EXAMPLE 60

2 - [(3,4 - dimethoxy phenyl)-hydroxy-methyl] 3-propyl 5-(2-oxo 2,5-dihydro 4-furyl) benzo[b]furan (4127 CB)

One proceeds as in Example 41 but replacing compound 3556 CB by an equimolecular amount of compound 4126 CB. $MP_c=156-157°$ C. (from ethyl acetate); yield: 80%.

PHARMACODYNAMIC INVESTIGATION

The compounds of the Formulae I and II have been studied to assess their action on the blood supply to coronary, visceral and peripheral blood vessels, their effect on systemic arterial blood pressure, and finally their possible effect on the contraction of the cardiac muscle.

The following methods were used:

(1) Measurement of coronary supply, and of systemic arterial pressure.

These experiments were carried out with dogs weighing 10 to 15 kg. After administering a general anaesthetic using urethane-chloralose, and closed circuit artificial respiration, a thoracotomy was carried out in the fifth intercostal space on the right, and the heart was exposed after opening the pericardium and fixing it to the rib side. The dog was subsequently treated with heparin to render the blood incoagulable. A special probe was then introduced into the right superficial jugular vein and was pushed gently as far as the right auricle. The index finger of the left hand of the operator then guides the end of the probe in the orifice of the coronary vein sinus by gentle pressure exerted across the side of the right auricle. When the probe is properly in position it is possible to inflate, from outside the animal, a small rubber latex balloon which renders the system completely leak-tight and avoids any leakage between the sides of the blood vessel and the probe; the supply of blood leaving the coronary sinus can thus be measured by means of a graduated tube and a stop watch. The blood leaving the graduated tube is collected in a decanting flask and is then reinjected continuously into the animal, after having been re-heated to 39° C.

This method reduces blood loss to the greatest possible extent. At the same time the arterial blood pressure is measured by a manometric method, and the cardiac rhythm is also measured.

(2) Investigation of the effect on blood supply in visceral and peripheral vessels.

Most of the compounds investigated have shown a significant hypotensive effect, but some of them, particularly compound CB 4091, have attracted attention by their marked and prolonged hypotensive effect.

It has been checked that the hypotensive activity is displayed with different species of animals (dog, cat, rabbit, rat) regardless of whether administered orally or parenterally, and whether the animals treated were asleep or awake.

The mechanism of the observed hypotension was established by a study of various phenomena: effect on the cardiac rhythm, effect on the action of chemical agents, and finally a study of the variation of blood supply in the blood vessels of different parts of the animal, by direct measurement in the majority of experiments and by plethysmographic method in some cases.

These studies revealed that the mechanism of the hypotensive activity displayed by compound CB 4091 and related compounds is connected with the relaxing action of these compounds on the smooth muscle of the blood vessels of different parts of the animal. This action causes an increase in the bore of the arterial and capillary vessels.

(3) Study of cardiotonic effect.

The cardiotonic effect was studied by two different methods:

(a) An "in vitro" method, using auricles isolated from guinea pigs.

Auricles isolated from all species of animals possess the property of contracting spontaneously if maintained in a live state in a physiological nutrient liquid at an appropriate temperature and with sufficient oxygen supply. With this type of preparation it is possible to record graphically the ampitude and the rhythm of the contractions of the cardiac muscle.

For reasons of convenience, allowing a large number of experiments, and also because of its sensitivity to cardiotonic substances, the guinea pig was the species of animal finally chosen.

(b) "In vivo" method, using a whole animal (dog).

This consists in carrying out a direct myography on a bundle of muscular fibres of the right ventricular myocardium, using an animal which had been anaesthetised, placed under artificial respiration and had had its thorax opened.

The bundle of muscle fibres is trapped between a fixed pair of forceps at the apex and a movable pair of forceps placed below the right auriculo-ventricular sulcus. A constant tension of the order of 150–180 grams, applied by an adjustable tension coil spring, is applied to the movable forceps. The movement is transmitted by an assembly of pulleys, and can be recorded graphically.

This method has the advantage of permitting the measurement not only of the maximum shortening of the myocardial muscle fibre at the instant of its contraction (positive inotropic effect), but also the state of the muscle tone (tonotropic effect).

Conclusions

A number of the compounds studied have the interesting characteristic of simultaneously increasing the coronary supply and the contraction of the myocardium. The majority of the compounds of this group are hypotensive, with intensities of effect which vary considerably from one compound to the other, but in those cases where the predominant property is the hypotensive effect, one nevertheless observes a noticeable coronaro-dilatant and cardiotonic activity.

The results are presented in two tables: the first table (Table V) comprises the ketonic products of chemical Table III. The second (Table VI) summarises the alcoholic compounds, and their derivatives, as listed in chemical Table IV.

TABLE V

| No. | Concentration or dose applied; method of administration; solvent used | Coronarodilatant activity (treating papaverine as 1) | Hypotensive activity (treating papaverine as 1) | Cardiotonic activity (treating ouabain as 1) | | Observations |
|---|---|---|---|---|---|---|
| | | | | Effect on an isolated guinea pig auricle | Effect on the heart of a dog "in situ" | |
| 3556 | $1 \times 10^{-6}$ and $1 \times 10^{-5}$ 1,2-propanediol. | | | 0.21 | | |
| 3638 | 1,2-propanediol $1 \times 10^{-6}$ and $1 \times 10^{-5}$ 1 and 2 mg./kg. i.v. | | Augmented. | 0.65 | 0.060 | |
| 3641 | $1 \times 10^{-6}$ and $1 \times 10^{-5}$ 1 and 2 mg./kg. i.v. 1,2-propanediol. | | Slightly decreased. | 0.50 | 0.052 | |
| 3671 | $1 \times 10^{-6}$ and $1 \times 10^{-5}$ 1 and 2 mg./kg. i.v. 1,2-propanediol. | | Unchanged. | 0.35 | 0.008 | |
| 3672 | $1 \times 10^{-6}$ and $1 \times 10^{-5}$ 1 and 2 mg./kg. i.v. 1,2-propanediol. | | Unchanged. | 0.94 | 0.020 | |
| 4000 | $1 \times 10^{-6}$ and $1 \times 10^{-5}$ 1,2-propanediol. | | | 0.425 | | |
| 3676 | $1 \times 10^{-6}$ and $1 \times 10^{-5}$ 1 and 2 mg./kg. i.v. 1,2-propanediol. | | Unchanged. | 0.46 | 0.003 | |
| 4106 | $1 \times 10^{-6}$ and $1 \times 10^{-5}$ 1,2-propanediol. | | | 0.32 | | |
| 4032 | $1 \times 10^{-6}$ and $1 \times 10^{-5}$ 1,2-propanediol. | | | 0.34 | | |
| 4030 | $1 \times 10^{-6}$ and $1 \times 10^{-5}$ 1,2-propanediol. | | | 0.50 | | |
| 4053 | 2 mg./kg. i.v. water+0.5% acetic acid. 1,2-propanediol. | 2.7 | −35 percent. | | | |
| 4085 | 2 mg./kg. i.v. 1,2-propanediol. | 1.15 | −23 percent. | | | |
| 3970 | $1 \times 10^{-6}$ and $1 \times 10^{-5}$ 1 mg./kg. i.v. 1,2-propanediol. | 2.5 | 0. | 0.15 | | |
| 4140 | 2 mg./kg. i.v. very slightly soluble. 1,2-propanediol. | 1 | −10 percent. | | | |

TABLE V—Continued

| No. | Concentration or dose applied; method of administration; solvent used | Coronarodilatant activity (treating papaverine as 1) | Hypotensive activity (treating papaverine as 1) | Cardiotonic activity (treating ouabain as 1) | | Observations |
|---|---|---|---|---|---|---|
| | | | | Effect on an isolated guinea pig auricle | Effect on the heart of a dog "in situ" | |
| 4061 | 2 mg./kg. i.v. 1,2-propanediol. | 4.5 | −34 percent. | | | Toxicity LD 50 i.p. >700 mg./kg. LD 0— p.o. >700 mg./kg. |
| 4070 | 2 mg./kg. i.v. 1,2-propanediol. | 1 | −35 percent. | | | |
| 4055 | 1×10⁻⁶ and 1×10⁻⁵ 1,2-propanediol. | 0.46 | −40 percent. | 0.63 | | |
| 4075 | 2 mg./kg. i.v. 1,2-propanediol. | 0.51 | −35 percent. | | | |
| 4126 | 2 mg./kg. i.v. 1,2-propanediol plus ethyl oleate. | 1.33 | −24 percent. | | | |

TABLE VI

| No. | Concentration or dose applied; method of administration; solvent used | Coronarodilatant activity (treating papaverine as 1) | Hypotensive activity (treating papaverine as 1) | Cardiotonic activity (treating ouabain as 1) | | Observations |
|---|---|---|---|---|---|---|
| | | | | Effect on an isolated guinea pig auricle | Effect on the heart of a dog "in situ" | |
| 3574 | 1×10⁻⁶ and 1×10⁻⁵ 2 mg./kg. i.v. 1,2-propanediol. | 1 | Slightly lowered. | 0.81 | 0.050 | Toxicity LD 50 (mouse) s.c. >1,000 mg./kg. p.o. >1,000 mg./kg. |
| 3865 | 1×10⁻⁶ and 1×10⁻⁵ 1,2-propanediol. | | 0. | 0.32 | | |
| 4091 | 1×10⁻⁶ and 1×10⁻⁵ 1 and 2 mg./kg. i.v. water+Na₂CO₃. | 2.5 | −50%. | 0.20 | 0.050 | Toxicity LD 50 (mouse) s.c.= 335 mg./kg. p.o.=550. |
| 3639 | 1,2-propanediol 1×10⁻⁶ and 1×10⁻⁵ 1 and 2 mg./kg. i.v. | | Maximum increase. | 0.32 | 0.036 | |
| 3640 | 1×10⁻⁶ and 1×10⁻⁵ 1 and 2 mg./kg. 1,2-propanediol. | 4 | Maximum increase. | 0.72 | 0.070 | Toxicity LD 50 (mouse) s.c.= 1,800 mg./kg. |
| 3877 | 1×10⁻⁶ and 1×10⁻⁵ 1,2-propanediol. | | 0. | 0.16 | | |
| 3984 | 1×10⁻⁶ and 1×10⁻⁵ 5 mg./kg. i.v. water+propanediol water+Na₂CO₃. | 1 | −46%. | 0.25 | | Toxicity LD 50 (mouse) s.c.= 300 mg./kg. p.o.= 400 mg./kg. |
| 3665 | 1×10⁻⁶ and 1×10⁻⁵ 1 mg./kg. i.v. 1,2-propanediol. | 0.11 | Slightly lowered. | 0.74 | 0.028 | |
| 3670 | 1×10⁻⁶ and 1×10⁻⁵ 1 mg./kg. i.v. 1,2-propanediol. | | Maximum increase. | 0.73 | 0.041 | |
| 3688 | 1 and 2 mg./kg. i.v. 1,2-propanediol. | 0.36 | Slightly lowered. | 0.33 | | |
| 4010 | 2 mg./kg. i.v. 1,2-propanediol. | 1.38 | −25%. | 0.31 | | |
| 4140 | 2 mg./kg. i.v. very slightly soluble in 1,2-propanediol. | 1 | −10%. | | | |
| 4103 | 2 mg./kg. i.v. 1,2-propanediol. | 2 | −40%. | | | |

TABLE VI—Continued

| No. | Concentration or dose applied; method of administration; solvent used | Coronarodilatant activity (treating papaverine as 1) | Hypotensive activity (treating papaverine as 1) | Cardiotonic activity (treating ouabain as 1) Effect on an isolated guinea pig auricle | Effect on the heart of a dog "in situ" | Observations |
|---|---|---|---|---|---|---|
| 4033 | 1×10⁻⁶ and 1×10⁻⁵ 2 mg./kg. i.v. 1,2-propanediol. | 1.38 | −30%. | 0.40 | | |
| 4054 | 2 mg./kg. i.v. 1,2-propanediol. | 0.92 | −50%. | | | |
| 4083 | 2 mg./kg. i.v. 1,2-propanediol. | 1.75 | −23%. | | | |
| 4085 | 2 mg./kg. i.v. 1,2-propanediol. | 1.15 | −23%. | | | |
| 4025 | 1×10⁻⁶ and 1×10⁻⁵ 2 mg./kg. i.v. 1,2-propanediol. | 4.2 | −45%. | 0.50 | 0.10 | Toxicity LD 50 (mouse) i.v.= 75 mg./kg. i.p.=1,80— s.c.=1,500— p.o.=1,800— |
| 4141 | 2 mg./kg. i.v. 1,2-propanediol. | 2.4 | −42%. | | | |
| 4058 | 1×10⁻⁶ and 1×10⁻⁵ 1,2-propanediol. | 3.8 | −45%. | 0.37 | | |
| 4127 | 2 mg./kg. i.v. 1,2-propanediol. | 0.17 | −45%. | | | |

The compounds studied in the above tables have been shown, in general, to have a low degree of toxicity. For example, the toxicity of compounds 4091 CB and 4025 CB, studied in mice by oral or hypodermic administration and assessed by the method of Karber and Behrens, is as follows:

For 4091 CB

About mg./kg.
LD 50, by hypodermic administration _____ 350
LD 50, by oral administration _____ 550

For 4025 CB

LD 50, by hypodermic administration _____ 1500
LD 50, by oral administration _____ 1800

Furthermore, some animals have been treated daily, for three months at the rate of 60 mg. of 4091 CB by mouth per kg. or at the rate of 100 mg. of 4025 CB by mouth per kg. These animals behaved normally and no abnormality was established in a histological study of the animals.

The compounds having the general formula (A) particularly 4025 CB or 2-[3,4-dimethoxy phenyl)-hydroxy-methyl] 3-ethyl 5-(2-oxo 2,5-dihydro 4-furyl) benzo [b] furan and 4091 CB or 2-(1-succinyloxy-ethyl) 3-methyl 5-(2-oxo 2,5-dihydro 4-furyl) benzo [b] furan have one or more of the following therapeutic actions, namely vasodilatant, hypotensive, and cardiotonic activities and they can be utilised in medicine in the treatment of the following conditions:

arteritis
cerebral arteriosclerosis
ulceration of the lower limbs
manifestations of arterial hypertension
coronary syndromes.

It will be understood that the compounds of the invention could be associated with therapeutic substances which complement the activity of the compounds of the invention, such as sulphonamide diuretics or substances having a hypotensive effect such as reserpine. The compounds of the invention may be utilised in therapeutic medicine in dosage units of about 5 to 500 mg. in the form of tablets or in the form of a solution for intravenal or intramuscular injection (in cases where the selected compound is soluble in a pharmaceutically acceptable solvent). Among the compounds of the formula (A) are compounds such as 4091 CB, which are hemiesters of succinic acid. Consequently, such compounds may also be marketed in the form of alkali metal salts, alkali earth metal salts, pharmaceutically acceptable amine salts and examples of suitable salts are: salts of sodium, potassium, magnesium, ammonium, pyrrolidine, morpholine, diethyl-amine and ethanolamine.

Examples of suitable pharmaceutical formulations are given below:

TABLETS

*Formulation I*

Mg.
2-(1-succinyloxy ethyl) 3-methyl 5-(2-oxo 2,5-dihydro-4-furyl) benzo [b] furan (4091 CB) _____ 50
Pharmaceutical excipient _____ Sufficient for a tablet.

*Formulation II*

Mg.
[2-(3,4-dimethoxy phenyl)-hydroxy-methyl] 3-ethyl 5-(2-oxo 2,5-dihydro 4-furyl) benzol [b] furan (4025 CB) _____ 250
Pharmaceutical excipient _____ Sufficient for a tablet.

The tablets are prepared according to the usual methods of double compression or granulation with the help of an aqueous solution of a gum or a non-aqueous solvent such as ethyl alcohol. The excipients used may be, for example, starch, talc, gum arabic, magnesium stearate or carboxymethylcellulose. The tablets may be rendered enteric by glutinisation or covering with a substance resistant to the action of gastric juice such as cellulose acetophthalate with a view to preventing an action of stomach hydrochloric acid on the active principle or avoiding possible gastric disorders. The tablets may be enveloped in a sugar or other coating, which is opaque and may be coloured.

*Formulations for injection*

The 2-(1-succinyloxy ethyl) 3-methyl 5-(2-oxo 2,5-dihydro 4-furyl) benzo [b] furan (4091 CB) is dissolved in water, containing a slight stoichiometric excess of morpholine, e.g. for each gram of 4091 CB 33 ml. of 1% aqueous solution of morpholine. After dissolving the compound at a temperature of about 4° C., the resultant solution is diluted with water to a volume of about 50 ml., the solution is filtered on sterilised filter material and is filled for example into the ampoules in an amount of 0.5 ml. per ampoule. The solution is cooled and freeze dried according to the usual techniques.

Each ampoule prepared in these conditions contains 10 mg. of 4091 CB in the form of morpholine salt, which is dissolved in distilled, sterilised water at the time of use.

At present the preferred compounds are 4091 CB and 4025 CB and the former compound may be administered in the treatment of coronaritis and arteritis at a dosage rate of 200 to 400 mg. per day in tablets containing 50 mg. of the active ingredient, while the latter compound may be administered at a dosage rate of 250 to 1500 mg. per day in tablets containing 250 mg. of the active ingedient.

What I claim is:

1. A furan compound having the formula:

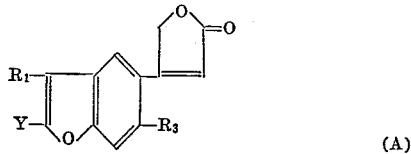

(A)

wherein $R_1$ represents an alkyl $R_3$ represents a member of the group consisting of hydrogen and alkoxy and Y represents a member of the group consisting of

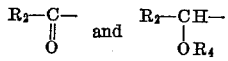

in which $R_2$ represents a member of the group consisting of alkyl, unsubstituted phenyl, and substituted phenyl having from 1 to 3 substituents selected from the group consisting of hydroxy, alkanoyloxy, alkoxy, and dialkylamino alkoxy, and $R_4$ represents a member of the group consisting of hydrogen, alkyl, alkanoyl, and carboxy alkanoyl, each of said alkyl, alkoxy, and alkanoyl having from 1 to 4 carbon atoms.

2. A furan compound of the formula:

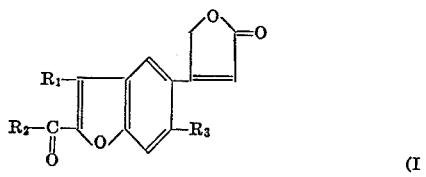

(I)

wherein $R_1$, $R_2$ and $R_3$ have the same significance as in claim 1.

3. A furan compound of the formula:

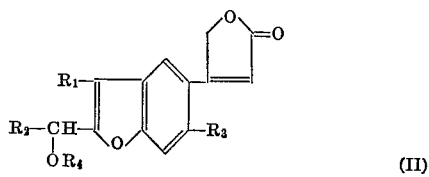

(II)

wherein $R_1$, $R_2$, $R_3$ and $R_4$ have the same significance as in claim 1.

4. 2-(1-hydroxy ethyl) 3-methyl 5-(2-oxo 2,5-dihydro 4-furyl) benzo[b]furan.

5. 2-(1-hydroxy ethyl) 3-ethyl 5-(2-oxo 2,5-dihydro 4-furyl) benzo[b]furan.

6. 2-(1-succinyloxy ethyl) 3-methyl 5-(2-oxo 2,5-dihydro 4-furyl) benzo[b]furan.

7. 2-(1-succinyloxy ethyl) 3-ethyl 5-(2-oxo 2,5-dihydro 4-furyl) benzo[b]furan.

8. 2-(3,4-dihydroxy benzoyl) 3-ethyl 5-(2-oxo 2,5-dihydro 4-furyl) benzo[b]furan.

9. 2-[(3,4-dimethoxy phenyl)-hydroxy-methyl] 3-ethyl 5-(2-oxo 2,5-dihydro 4-furyl) benzo[b]furan.

10. A furan compound having the formula:

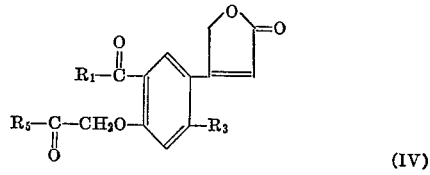

(IV)

in which $R_1$ and $R_3$ have the same significance as in claim 1, and $R_5$ represents a member of the group consisting of alkyl, unsubstituted phenyl, and substituted phenyl having three alkoxy substituents, said alkyl and said alkoxy having from 1 to 4 carbon atoms.

11. A furan compound having the formula:

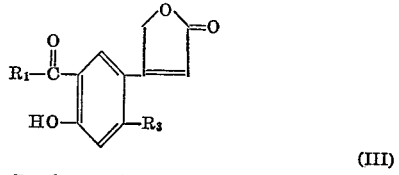

(III)

in which $R_1$ and $R_3$ have the same significance as in claim 1.

References Cited

Rodd, Chemistry of Carbon Compounds, vol. IV A, p. 170; QD 251.R6.

Wagner et al., Synthetic Organic Chemistry, pp. 171, 226–27, 317–18.

ALEX MAZEL, *Primary Examiner.*

J. A. NARCAVAGE, *Assistant Examiner.*